US006286637B1

United States Patent
Park et al.

(10) Patent No.: US 6,286,637 B1
(45) Date of Patent: Sep. 11, 2001

(54) CONTACTLESS EDDY CURRENT BRAKE FOR CARS

(75) Inventors: Kyi Hwan Park; Kap Jin Lee, both of KwangJu (KR)

(73) Assignee: Kwangju Institute of Science & Technology (KR)

( * ) Notice: Subject to any disclaimer, the term of this patent is extended or adjusted under 35 U.S.C. 154(b) by 0 days.

(21) Appl. No.: 09/243,713

(22) Filed: Feb. 3, 1999

(30) Foreign Application Priority Data

Mar. 9, 1998 (KR) .................................................. 98-7665
Dec. 29, 1998 (KR) ................................................ 98-60145

(51) Int. Cl.[7] ....................................................... B60L 7/00
(52) U.S. Cl. ........................................... 188/158; 303/152
(58) Field of Search ................................. 188/158, 159, 188/161, 162, 156, 157; 303/152

(56) References Cited

U.S. PATENT DOCUMENTS 4,203,046 * 5/1980 Homann et al. ........................ 310/93
4,235,316 * 11/1980 Blomberg ........................ 188/181 R
4,326,236 * 4/1982 McNair et al. ....................... 361/170
4,775,145 * 10/1988 Tsuyama ................................ 272/73
5,254,061 * 10/1993 Leask ..................................... 482/63

* cited by examiner

Primary Examiner—Robert J. Oberleitner
Assistant Examiner—Xuan Lan Nguyen
(74) Attorney, Agent, or Firm—Martine & Penilla, LLP

(57) ABSTRACT

A contactless eddy current brake for cars is disclosed. In the brake, two cores are arranged around the edge of a brake disc while being spaced apart from each other at an angle of 90°. Each of the cores is wound with a coil, thus forming an electric magnet. A speed sensor is positioned around the axle, thus sensing revolutions of the wheel. A control unit calculates a DC or AC control current in response to a speed signal output from the sensor, thus outputting an appropriate control current value to the coils. A current amplifier supplies the control current value from the control unit or a current value from a brake pedal to the coils of the cores. The control unit allows a DC current to be supplied to the coils when the car runs at a high speed or allows an AC current with different phases to be supplied to the coils when the car runs at a low speed or is stopped on a slope. In such a case, the DC current is variable in accordance with a pedaling force, while the AC current is variable in the frequency in accordance with the pedaling force.

2 Claims, 7 Drawing Sheets

[Fig. 1]

Prior Art

Prior Art

[Fig. 9]

Prior Art

CONTACTLESS EDDY CURRENT BRAKE FOR CARS

BACKGROUND OF THE INVENTION

1. Field of the Invention

The present invention relates to a contactless eddy current brake for cars.

2. Description of the Prior Art

As well known to those skilled in the art, known contact brakes for cars are designed to be operated by hydraulic or pneumatic pressure, thus pressing against the brake disc of a wheel using frictional brake pads and making a car go slow or stop. However, such known contact brakes are problematic in that the brake pads are frictionally abraded due to frictional contact of the brake pads with the brake disc and there exists a time delay while increasing the frictional pressure against the brake disc. Another problem experienced in the known brakes resides in that the brakes have a large volume and fail to effectively brake the wheels while driving a car at a high speed.

In a detailed description, known contact brakes for cars are devices that frictionally press against the brake disc of a wheel, thus making a car go slow or stop. Such contact brakes are designed to convert kinetic energy of rotating wheels into thermal energy using a mechanical friction means prior to dissipating the thermal energy into the atmosphere, thereby performing a desired braking operation. The contact brakes, operated by hydraulic pressure, are typically classified into two types: drum brakes and disc brakes. The known disc brakes individually comprise a plurality of brake pads, which are positioned around both sides of a brake disc integrated with a wheel, and frictionally press against the brake disc when it is necessary to make a car go slow or stop.

Figure 8:
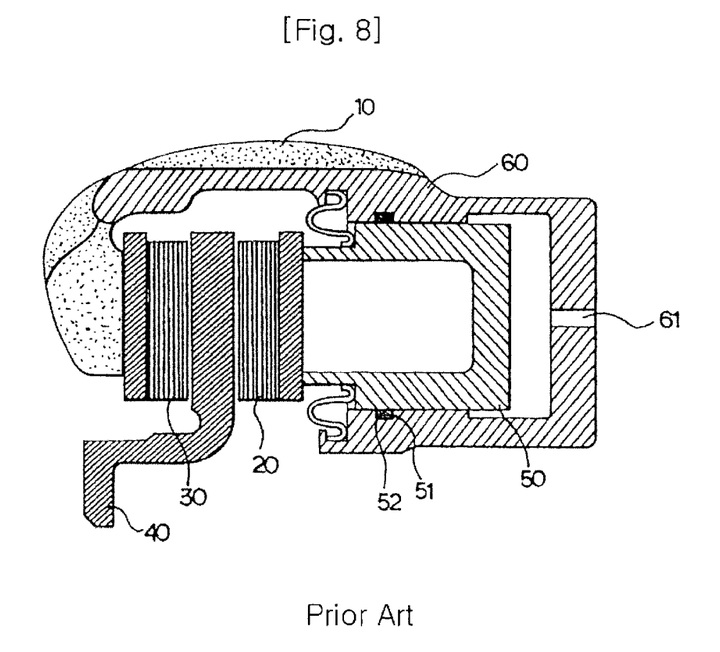
FIG. 8 is a sectional view, showing the construction of a typical disc brake.

FIG. 8 is a sectional view, showing the construction of a typical disc brake. As shown in the drawing, the disc brake comprises two movable pads or inside and outside pads 20 and 30 which are set in a housing 10 while being parallel to each other with a gap being formed between them. A disc 40, which is integrated with and rotatable along with a wheel, is positioned in the gap between the two pads 20 and 30 in a way such that the disc 40 is normally spaced apart from both pads 20 and 30. A cylinder actuator, comprising a piston 50 and a cylinder 60, is positioned at one side of the inside pad 20, with the piston 50 being capable of pressing he two pads 20 and 30 against both sides of the disc 40 using pressurized oil from a master cylinder (not shown). The cylinder 60 of the actuator is provided with an oil port 61 at its end wall for selectively introducing the pressurized oil from the master cylinder into said cylinder 60. A spring 51 is set in an annular groove 52, formed on the interior wall of the cylinder 60, so that the spring 51 normally biases the piston 50 relative to the cylinder 60 in a direction where the piston 50 returns to its original position. That is, when a brake pedal (not shown) is released, the spring 51 elastically forces the piston 50 to return from an operational position to a released position.

When operating a brake pedal while driving a car, a back pressure is formed in the master cylinder, so that the master cylinder out puts pressurized oil. The pressurized oil from the master cylinder is, thereafter, introduced into the cylinder 60 of the actuator through the oil port 61, thus acting on the piston 50. The piston 50 thereby causes the inside pad 20 to instantaneously press against the disc 40. In such a case, the housing 10 also moves to the right in the drawing under the guide of a slide unit (not shown) due to the hydraulic pressure acting in the cylinder 60. Such a movement of the housing 10 causes the outside pad 30 to press against the disc 40, so that the two brake pads 20 and 30 perform a braking operation. When the brake pedal is released, the piston 50 elastically returns to the original position by the restoring force of the spring 51, thus allowing the disc 40 to be released from the two pads 20 and 30.

However, since the above disc brake is necessarily provided with a complex hydraulic system, so that the construction of the brake is undesirably complicated, this results in an increase in the production cost while manufacturing the brakes. Another problem experienced in such brakes resides in that the brakes fail to immediately stop a car, but allow the car to travel a free running distance for a time until the pressurized oil from the master cylinder effectively acts on the piston in the cylinder actuator. This may undesirably cause traffic hazards.

Figure 9:
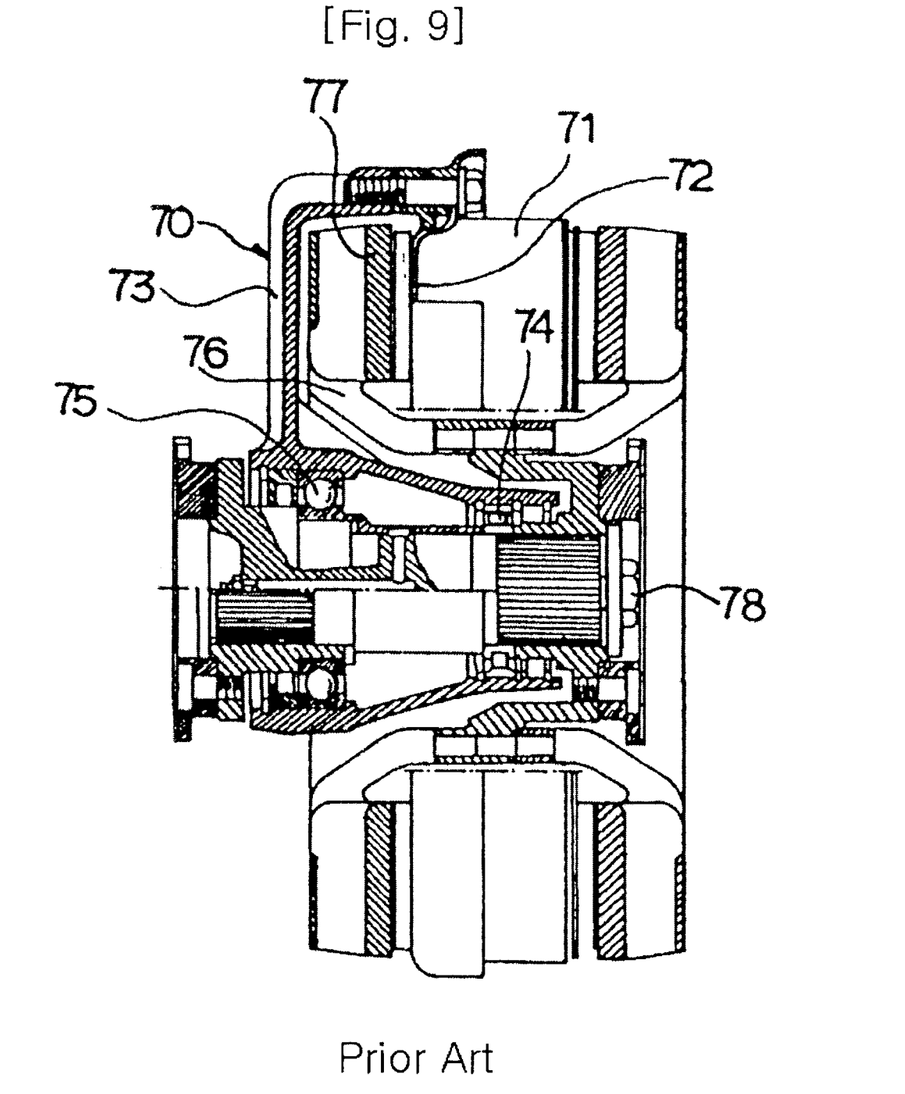
FIG. 9 is a sectional view, showing the construction of a typical eddy current brake used as a retarder.

FIG. 9 is a sectional view, showing the construction of a typical eddy current brake used as a retarder. As shown in the drawing, the eddy current brake comprises a stator and a rotor. The stator comprises a coiled solenoid 71 which is supported by an annular frame 70. The above solenoid 71 surrounds a ring 72 which is coupled to a radial arm 73. On the other hand, the rotor comprises a magnetic disc 77, which is made of a magnetic material and is connected to a bent arm 76. The above rotor is firmly locked to an axle using a bolt 78, so that the rotor is rotatable in cooperation with the axle. In order to allow the rotor to be rotatable independently of the stator, both a spline 74 and a bearing 75 are interposed between the rotor and stator.

When activating the above brake while driving a car, the coiled solenoid 71, positioned around the magnetic disc 77, is turned on, thus forming a magnetic flux. The magnetic flux is perpendicularly introduced Into the magnetic disc 77 prior to flowing to another solenoid (not shown) from said disc 77. An eddy current is thus induced in the magnetic disc 77 due to the Faraday's law. A Lorentz force is generated by the relative action between the eddy current and the magnetic flux, thus forming a braking torque. However, such an eddy current brake is problematic in that it is not suitable for being used as a main brake system for cars since the braking torque is too low when a car runs at a low speed.

In recent years, a brake, which uses a liquid having a pressure capable of being variable in accordance with the power of the magnetic field or the electric field and overcomes the problems experienced in brakes using the solenoids, has been actively studied. However, the brakes, using such a liquid, are problematic in that they necessarily use expensive devices and have a complex construction. In addition, it is necessary to propose more effective and reliable brake systems in accordance with an increase in the maximum speed of a car.

SUMMARY OF THE INVENTION

Accordingly, the present invention has been made keeping in mind the above problems occurring in the prior art, and an object of the present invention is to provide a contactless eddy current brake for cars, which introduces a magnetic field to a copper brake disc, thus inducing an eddy current in the disc, and applies a contactless braking torque to the disc due to a relative action between the eddy current and the magnetic field formed by an electric magnet, thus providing a desired slip ratio.

Another object of the present invention is to provide a contactless eddy current brake for cars, which is designed to selectively apply a DC current to coils of a core when a car runs at a high speed, or to apply an AC current with different phases to the coils when the car runs at a low speed or is stopped on a slope, thus providing a variable braking torque for the wheels in accordance with conditions of the car, with the DC current being variable in accordance with a pedaling force acting on a brake pedal and the AC current being variable in the frequency in accordance with the pedaling force.

A further object of the present invention is to provide a contactless eddy current brake for cars, which has a controller used for controlling the DC or AC current when a car starts to slip, thus providing an appropriate torque to the wheels.

In order to accomplish the above objects, the present invention provides a contactless eddy current brake for cars, compromising: a brake disc concentrically integrated with an axle of a car and provided inside a wheel of the car; two cores arranged around the edge of the disc while being spaced apart from each other at an angle of 90°, each of said cores being wound with a coil, thus forming an electric magnet; a speed sensor positioned around the axle, thus sensing revolutions of the wheel; a control unit calculating a DC or AC control current in response to a speed signal output from the sensor, thus outputting an appropriate control current value to the coil of each of the cores; and a current amplifier supplying the control current value from the control unit or a current value from a brake pedal to the coils of the cores.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
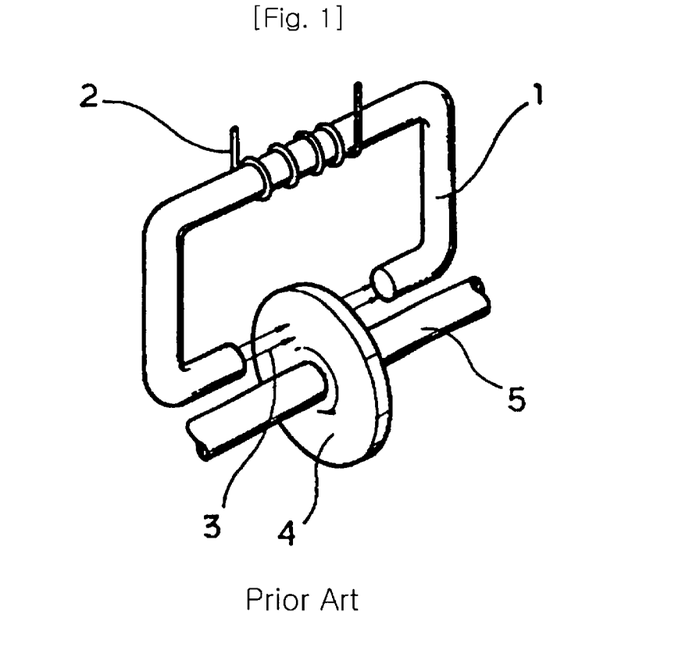
FIG. 1 is a perspective view of an eddy current brake of this invention, showing the operational theory of the brake.

FIG. 1 is a perspective view of an eddy current brake of this invention, showing the operational theory of the brake. As shown in the drawing, the brake of this invention comprises a core 1, which is wound with a coil 2 at a middle portion and is bent with both ends of the core 1 facing each other while being spaced out at an interval. The core 1 thus forms an electric magnet. A brake disc 4, concentrically integrated with an axle 5, is positioned between the two ends of the (core 1 while being spaced apart from the two ends. When a magnetic flux 3 is perpendicularly introduced into the disc 4 or the rotary conductor, an eddy current is induced in said rotary conductor 4. Due to a relative action between the magnetic flux 3 and the eddy current, a repulsive force is generated in the gap between the conductor 4 and the core 1. Such a repulsive force, caused by the eddy current, is a function of an input current, which is applied to the coil 2 so as to form both a desired rotating speed and a desired density of magnetic flux of the disc 4. When the input current is a constant current, the braking torque is increased or decreased in proportion to the rotating speed of the disc 4. In addition, when the currents, applied to the electric magnets, vary in accordance with a sine function while having different phases (90°), a braking torque is generated in accordance with the same theory as that of conventional induction motors.

Due to such operational characteristics, the eddy current brake is preferably used as an anti-lock brake system. That is, when the wheels slip on the ground surface, the brake of this invention automatically reduces the braking torque, thus effectively preventing the wheels from being undesirably locked. Therefore, when the brake of this invention is used as an anti-lock brake system, it is possible to allow the brake system to perform an optimal torque control and suddenly stop a car. Such an optimal torque control desirably results in a shortest brake distance. Such a shortest brake distance is accomplished when there exists a maximum friction factor between the wheels and the ground surface. The friction factor varies in accordance with the slip ratio which is caused by a difference between the rotating speed of the wheels and the running velocity of a car. Therefore, it is possible to accomplish an optimal torque control by maintaining an appropriate slip ratio agreeing with the conditions of the ground surface.

Figure 3:
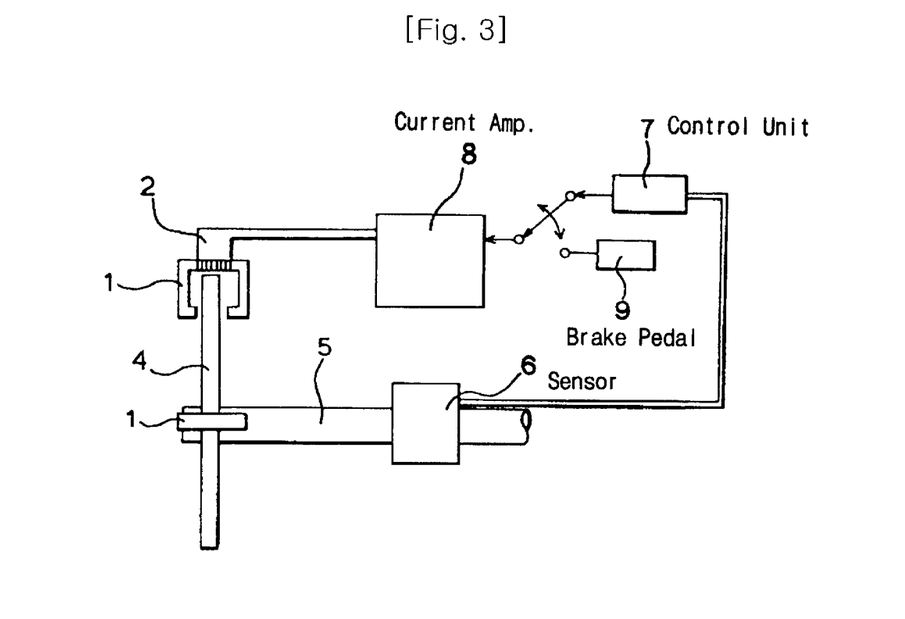
FIG. 3 is a block diagram, showing the construction of the brake of this invention.

In order to accomplish the above-mentioned optimal torque control, the brake of this invention is provided with a control unit 7 as shown in FIG. 3. The above control unit 7 receives a speed signal, representing the revolutions of the wheels, from a speed sensor 6 positioned around the axle 5 of the disc 4. Upon receiving the signal from the sensor 6, the control unit 7 outputs a control signal representing an input current for the coil 2 of the core 1, thus accomplishing an appropriate slip ratio.

The braking torque is a nonlinear function represented by both the input current for the coil 2 and the rotating speed of the disc 4. In addition, there exists an uncertainty in a dynamic model of a brake system. It is thus possible to design a brake system, which effectively endures the uncertainty of both the load torque of the brake and the friction factor between the wheels and the ground surface, using a sliding mode controller or a kind of consistent controller.

Figure 2:
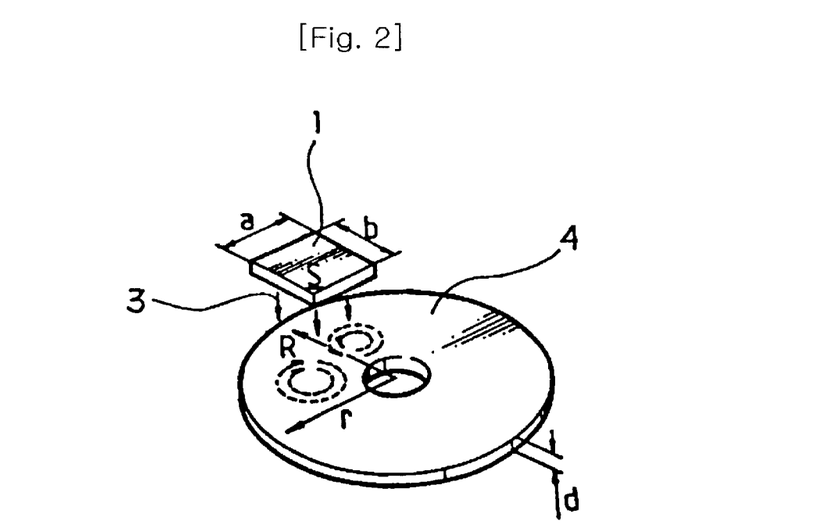
FIG. 2 is a perspective view, showing the dimension of the brake of this invention.

FIG. 2 is a perspective view, showing the dimension of the eddy current brake of this invention. In the drawing, "d" is a thickness of the disc 4, "S" is an end surface area of the core 1 through which the magnetic flux passes to the disc 4, "R" is a distance between the centers of the disc 4 and the end surface area of the core 1, "r" is a radius of the disc 4, "a" and "b" are width and length of the end surface of the core 1, respectively. In such a case, the total magnetic flux Φ, flowing in the magnetic circuit comprising the core 1 provided with a gap, is represented by the following expression (1).

$$\Phi = \frac{F}{R} \quad (1)$$

In the expression (1), F and R are magnetomotive force and magnetic reluctance, respectively, which are represented by the following expressions (2) and (3).

$$F = Ni \quad (2)$$

$$R = \frac{l_i}{\mu_o S} \quad (3)$$

In the expressions (2) and (3), N is the number of turns of the coil 2 wound on the core 1, $1_g$ is a length of the gap, $\mu_0$ is a permeability of the core 1 in the air. When the permeability $\mu_0$ of the core 1 in the air is infinite, the magnetic reluctance R in the core 1 is zero. In such a case, the magnetic reluctance in the air only affects the total magnetic reluctance of the magnetic circuit. From the expressions (1) to (3), the density B of magnetic flux is represented by the following expression (4).

$$B = \frac{1}{S}\Phi = \frac{1}{S}\frac{F}{R} = \frac{\mu_o Ni}{l_q} \quad (4)$$

As shown in the expression (4), neither the permeability $\mu_0$ of the core 1 nor the size and configuration of the end surface area of the core 1, through which the magnetic flux 3 passes, affects the density B of the magnetic flux. However, when considering the saturation of density of magnetic flux in a strong magnetic material, the density of magnetic flux ranges from about 0.4 T to about 2.1 T, so that the input current for the coil 2 is limited. The current J, induced in the conductive disc 4 due to the relative action between the density of magnetic flux and the rotary conductor 4, is represented by the following expression (5).

$$J = \sigma(u \times B) \quad (5)$$

In the expression (5), σ and u are conductivity and linear velocity, respectively, with the linear velocity u being measured at a point through which the magnetic flux passes. When the electric power Pd, consumed in the conductor, is completely converted into a braking torque Tb by the eddy current, the braking torque Tb is represented by the following expression (6).

$$T_b = \frac{P_d}{\dot{\theta}} \quad (6)$$

In the expression (6), $\dot{\theta}$ is a rotating speed of the disc 4. From the expression (5), the total power consumption Pd is represented by the following expression (7).

$$P_d = \rho J^2 \times Volume \quad (7)$$

$$= \sigma R^2 Sd\dot{\theta}^2 B^2$$

In the expression (7), ρ is the resistivity. The braking torque Tb of the expression (6) is thus also represented by the following expression (8).

$$T_b = \sigma R^2 Sd\left(\frac{\mu_o N}{l_g}\right)^2 i^2 \dot{\theta} \quad (8)$$

When compensating for the expression (8) using the compensation factors α and C while considering the leakage flux, the nonuniform flux and the configuration of the core 1, the expression (8) is represented by the following expression (9).

$$T_b = T_i i^2 \dot{\theta} \quad (9)$$

In the expression (9), $T_i$ is $\alpha C \sigma R^2 Sd\ (\mu N/l)^2$, and compensation factors α and C are respectively represented by the expressions (10) and (11).

$$\alpha = 1 - \frac{1}{2\pi}\left[4\arctan\left(\frac{b}{a}\right) + \frac{b}{a}\ln\left(1 + \frac{a^2}{b^2}\right) - \frac{a}{b}\ln\left(1 + \frac{b^2}{a^2}\right)\right] \quad (10)$$

$$C = 0.5\left[1 - \frac{ab}{\pi\left(1 + \frac{R}{r}\right)^2 (r - R)^2}\right] \quad (11)$$

The braking torque of the contactless eddy current brake of this invent[]on is calculated from he above expressions (1) to (11).

In order to experimentally show both the practically and the operational effect of the eddy current brake of this invention used as an anti-slip brake system for cars, a miniature simulation model was manufactured. Prior to manufacturing such a miniature simulation model, it was necessary to consider the size, configuration, material and production style of the core, the material of the brake disc, and the distance to the position of the core. In an effort to prevent any eddy current loss and allow a smooth flow of magnetic flux, it was preferable to use a silicon steel plate as the material of the core. It was more preferable to use a silicon steel plate, having a high knee point in the hysteresis loop, as the material of the core. However, in the simulation model, the core was made of SM45C. For ease of manufacture, the core was formed by layering a plurality of steel plates, individually having a U-shaped profile and 0.5 mm thickness, in a way such that the resulting core had a rectangular cross-section. When the steel plates were layered, it was originally necessary to insulate the junctions between the steel plates in order to prevent a generation of eddy current due to a variation of the magnetic flux in the core. However, such an insulation was preferably neglected during the manufacture of the simulation model since the variation of the magnetic flux in the core is not remarkable. In addition, it was preferable to use a copper alloy, having a high conductivity, as the material of the brake disc. Practically, the brace disc of the simulation model was made of chrome having a conductivity of 3.57×10⁷[1/Ωm]. In order to calculate the distance R between the centers of the disc and the core, it was necessary to calculate the distance R capable of maximizing $T_i$ in the expression (9). The design parameters of the simulation model are given in Table 1.

TABLE 1

Design Parameters of Simulation Model

| | |
|---|---|
| Weight of Model | 4 [kg] |
| Moment of Inertia of Wheel | 9.58 × 10⁻⁴ [kg.m2] |

TABLE 1-continued

Design Parameters of Simulation Model

| | |
|---|---|
| Radius of wheel | 50 [mm] |
| Number of Turns of Coil | 970 turn |
| Gap between Disc and Core | 1 [mm] |
| Radius of Disc | 50 [mm] |
| Thickness of Disc | 3 [mm] |
| Width of end surface of Core | 40 [mm] |
| Height of end surface of Core | 20 [mm] |
| Distance between the Centers of Disc and Core | 32.9 [mm] |

When the braking torque is reduced, the braking distance is increased. In addition, when the braking torque is exceedingly high, the brake causes a car to slip on the ground surface. Therefore, it is necessary to maintain an appropriate braking torque in order to reduce the braking distance. When designing a sliding mode controller capable of effectively enduring the uncertainty of both the load torque of the brake and the friction factor between the wheels and the ground surface while assuming that the controller only has information of a known characteristic equation of the friction factor between the wheels and the ground surface relative to the slip ratio, but does not practically measure the relation between the friction factor and the slip ratio, it is possible to calculate the input control current value (u) represented by the following expression (12).

$$u = \hat{u} + \bar{u} = \hat{\mu}_H g \frac{1}{\dot{\chi} \tau_i} + \frac{1}{\tau_i \dot{\theta}} \left[ (\hat{\mu}_H \tau_f - \hat{\tau}_c) + \left( \tau_c + \eta + \frac{\mu_H}{\dot{\chi}} (g\dot{\theta} + \dot{\chi}\tau_f) \right) sat(s/\Phi) \right] + \frac{\lambda}{\tau_i} + \frac{\dot{\chi}\lambda}{R_o \tau_i \dot{\theta}} (s_{rd} - 1) \quad (12)$$

The invention will be more clearly understood from the following detailed description taken in conjunction with the preferred embodiment.

Figure 4:
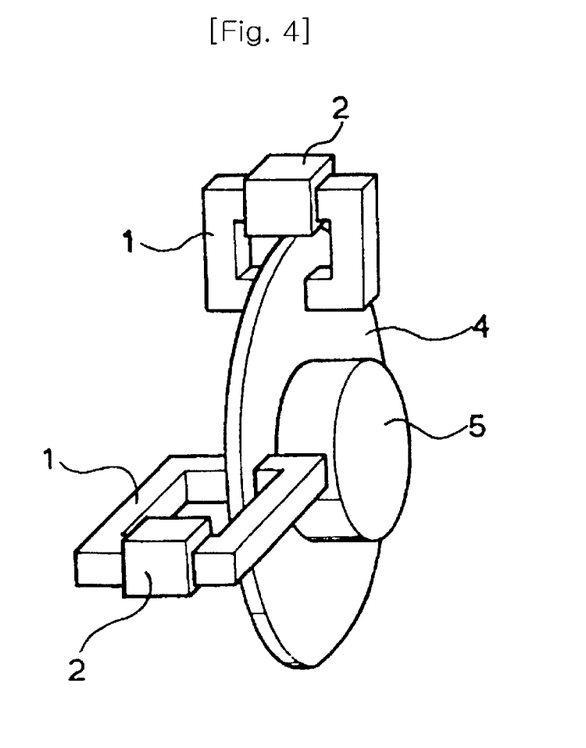
FIG. 4 is a perspective view of an eddy current brake for cars in accordance with the preferred embodiment of the present invention.
Figure 5:
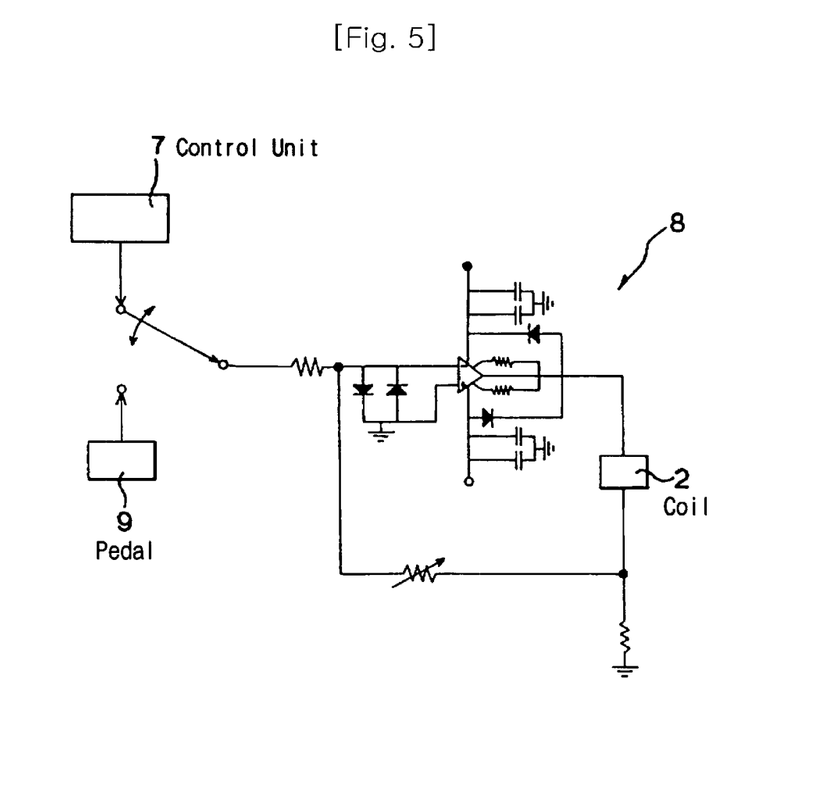
FIG. 5 is a circuit diagram of a current amplifier used in the brake of this invention.

FIG. 4 is a perspective view of an Eddy current brake for cars in accordance with the primary embodiment of this invention. As shown in the drawing, the brake of this invention comprises a copper brake disc 4. The brake also has a stator which comprises a core 1 wound with a coil 2. The above core 1 or an electric magnet is fixedly held on a knuckle by a mounting plate (not shown). The brake further comprises a current amplifier 8 which is used as a power source for the coil 2. In the above brake, the current amplifier 8 supplies the input control current value from the control unit 7 to the coils 2, thus allowing a car to be stopped with a shortest braking distance during a sudden stop of the car. The above current amplifier 8 is designed to selectively apply a DC current to the coils 2 when a car runs at a high speed, or to apply an AC current with different phases to the coils 2 when the car runs at a low speed or is stopped on a slope, thus providing a variable braking torque for the wheels in accordance with conditions of the car. In such a case, the DC current is variable in accordance with a pedaling force acting on a brake pedal 9, while the AC current being variable in the frequency in accordance with the pedaling force. When the current amplifier 8 is provided with a battery, corresponding to +Vs, it is not necessary to give a transformer to the amplifier 8. When using two stators in the brake as shown in FIG. 4, the two stators are arranged while being spaced apart from each other at an angle of 90°. Such an arrangement of the stators allows the brake to generate a desired high braking torque.

In a detailed description, each core 1, which is formed by layering a plurality of insulated silicon steel plates, is positioned on the edge of the copper disc 4 in a way such that the edge of the disc 4 is positioned in the gap between both ends of the core 1. The core 1 is wound with a coil 2. The above core 1 is fixed, so that each end of the core 1 is spaced apart from the disc 4 by a gap without being brought into contact with the disc 4. Therefore, there does not exist any contact braking torque between the core 1 and the disc 4. In the embodiment of FIG. 4, two stators, individually comprising the core 1 and the coil 2, are arranged on the edge of the disc 4 while being spaced apart from each other at an angle of 90°. Each of the stators is fixedly held on a knuckle by a mounting plate (nor shown). The coil 2, wound on each of the cores 1, is connected to the current amplifier 8.

When a brake pedal 9 is operated by a driver while driving a car, the current amplifier 8 supplies a variable current to the coils 2 of the stators in accordance with a pedaling force acting on the pedal 9. In such a case, a magnetic field is formed in both the core 1 and the gap between the two ends of said core 1. Since the disc 4 is positioned in the gap between the ends of the core 1, an eddy current is formed in the brake disc 4 due to the magnetic field. Therefore, a braking torque is generated due to a relative action between the eddy current and the magnetic field. In such a case, an appropriate input control current value is applied to the coils 2 of the cores from the control unit 7, thus accomplishing an appropriate slip ratio.

Particularly, when the brake is operated with a car running at a high speed, the magnetic field, formed in the brake disc 4, is somewhat effectively variable only by the rotating action of the disc 4. In such a case, the current amplifier 8 supplies a DC current to the coils 2 so as no generate a braking torque, with the DC current being variable in accordance with the pedaling force acting on the brake pedal 9. On the other hand, when the brake is operated with the car running at a low speed or being stopped on a slope, the current amplifier 8 supplies an AC current with different phases (90°) to the coils 2 so as to generate a braking force, the AC current being variable in the frequency in accordance with the pedaling force. Such an AC current allows the magnetic field in the disc 4 to be effectively variable, so that the brake generates a desired braking torque.

In order to compare the operational performance of the eddy current brake of this invention with that of a typical hydraulic brake, the operational performances of both brakes were experimentally measured using simulation models, and the simulation results are shown in the graphs of FIGS. 6a to 7d.

Figure 6A:
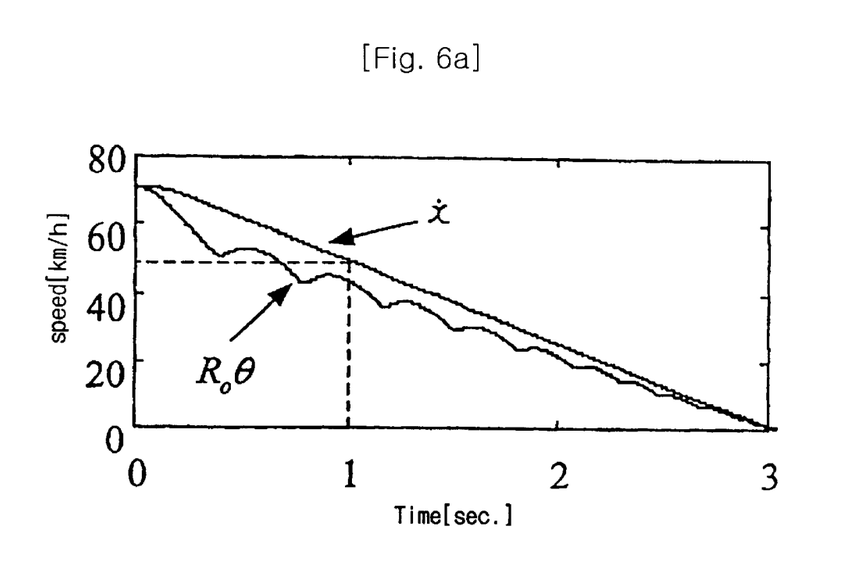
FIGS. 6a and 6b are graphs, showing the simulation results of an anti-lock brake system (ABS) having a typical hydraulic brake.
Figure 6B:
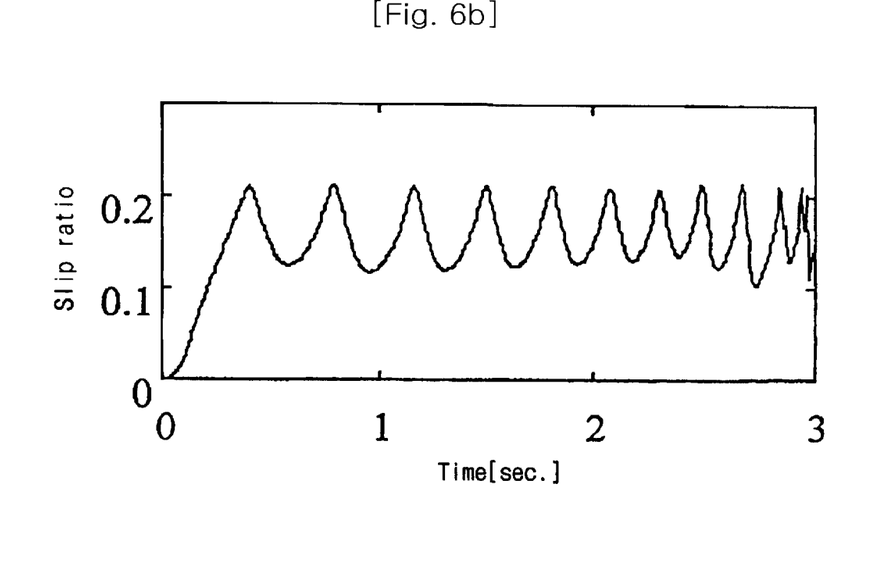
Figure 7A:
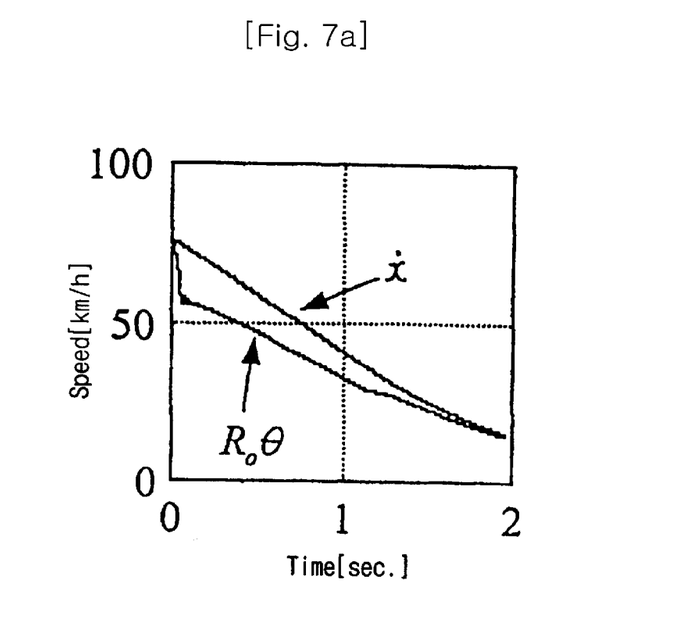
FIGS. 7a to 7d are graphs, showing the simulation results of an ABS having an eddy current brake (ECB) of this invention.
Figure 7B:
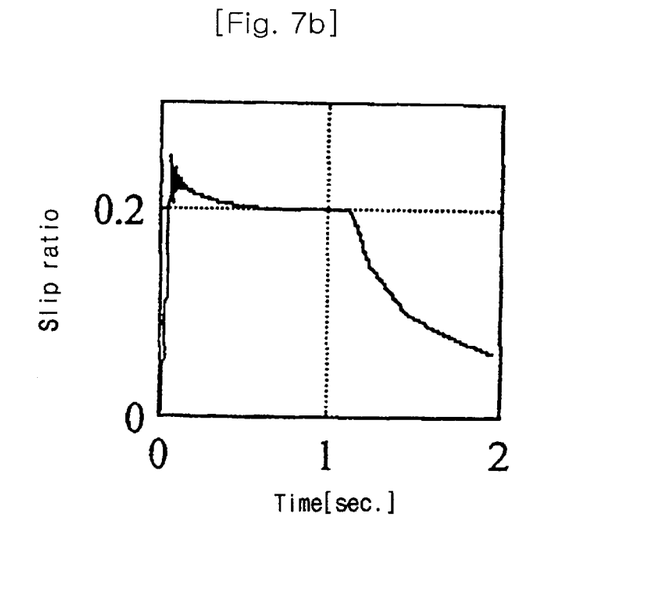
Figure 7C:
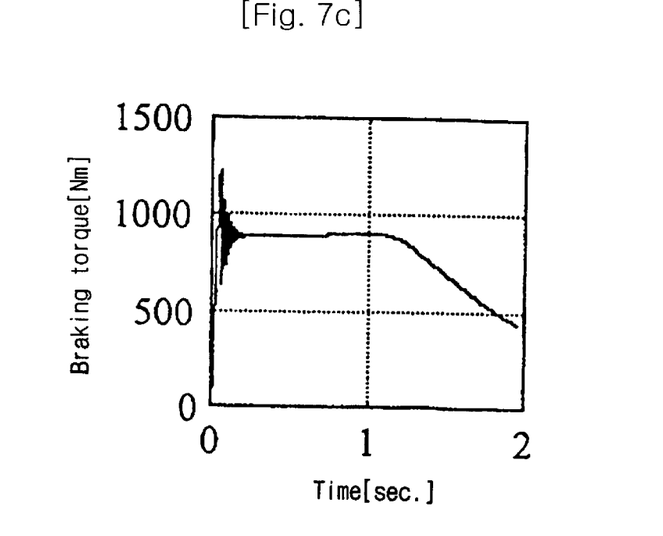
Figure 7D:
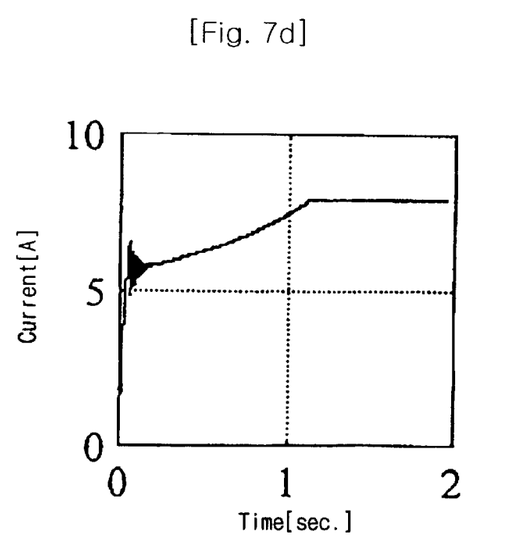

FIGS. 6a and 6b are graphs, showing the simulation results of an anti-lock brake system (ABS) having a typical hydraulic brake, with the simulation results being measured using a 1+e,fra 4+ee miniature simulation model. FIGS. 7a to 7d are graphs, showing the simulation results of an ABS having an eddy current brake of this invention, with the simulation results being measured using a ¼ miniature simulation model.

From the simulation results shown in the graphs of FIGS. 6a to 7d, it is noted that the eddy current brake of this invention effectively maintainings an appropriate slip ratio, thus accomplishing a short braking distance in comparison with a typical hydraulic brake even when a driver does not have any information about conditions of a road.

As described above, the present invention provides a contactless eddy current brake for cars. The brake of this invention generates a desired contactless braking torque using electric power, thus effectively preventing a frictional abrasion of brake pads different from typical hydraulic or pneumatic brakes. The brake also selectively supplies different currents: AC or DC current, to the coil of a stator in accordance with the running speed of a car, thus generating a desired braking torque when the brake is operated while driving a car at a high or low speed. The eddy current brake of this invention thus effectively brakes a car with an improved operational reliability and safety.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A contactless eddy current brake for cars, comprising:

a brake disc concentrically integrated with an axle of a car and provided inside a wheel of said car;

two cores arranged around an edge of said disc while being spaced apart from each other at an angle of 90°, each of said cores being wound with a coil, thus forming an electric magnet;

a speed sensor positioned around said axle, thus sensing revolutions of said wheel;

a control unit calculating a DC or AC control current in response to a speed signal output from said sensor, thus outputting an appropriate control current value to the coil of each of said cores; and a current amplifier supplying the control current value from the control unit or a current value from a brake pedal to the coils of the cores, wherein said current amplifier allows a DC current to be supplied to the coils when the car runs at a high speed or allows an AC current with different phases to be supplied to the coils when the car runs at a low speed or is stopped on a slope, with the DC current being variable in accordance with a pedaling force acting on said brake pedal and the AC current being variable in a frequency in accordance with said pedaling force.

2. The contactless eddy current brake according to claim 1, wherein said brake disc is made of copper.

* * * * *